United States Patent [19]

Brickenstein

[11] Patent Number: 5,800,660
[45] Date of Patent: Sep. 1, 1998

[54] METHOD OF PRODUCING ENTIRE FRAMES MADE UP OF PLASTIC PROFILES

[75] Inventor: Wolf-Jürgen Brickenstein, Papenburg-Aschendorf, Germany

[73] Assignee: Brugmann Frisoplast GmbH, Germany

[21] Appl. No.: 966,952

[22] Filed: Nov. 10, 1997

Related U.S. Application Data

[63] Continuation of Ser. No. 543,903, Oct. 17, 1995, abandoned.

[30] Foreign Application Priority Data

Oct. 17, 1994 [DE] Germany ............... 44 37 095.4

[51] Int. Cl.⁶ .................................................. B29C 65/00
[52] U.S. Cl. ..................... 156/264; 156/304.2; 156/304.6
[58] Field of Search ................................. 156/304.2, 264, 156/266, 304.5, 304.1, 152, 537, 108, 109, 292, 304.6; 29/423, 467, 897.312

[56] References Cited

U.S. PATENT DOCUMENTS

| | | | |
|---|---|---|---|
| 3,204,324 | 9/1965 | Nilsen | 29/897.312 |
| 3,470,598 | 10/1969 | Berthelsen | 29/897.312 |
| 3,697,633 | 10/1972 | Edgar | 156/264 |
| 4,462,147 | 7/1984 | Herb et al. | 29/423 |
| 4,752,350 | 6/1988 | Schuster | 156/304.2 |

FOREIGN PATENT DOCUMENTS

A0563030  9/1993  European Pat. Off. .
A2623750  8/1977  Germany .

*Primary Examiner*—Geoffrey L. Knable
*Attorney, Agent, or Firm*—Pendorf & Cutliff

[57] ABSTRACT

A description is given of a method for producing entire frames made up of plastic profiles for outer frames and sash frames. This method consists in the fact that the outer-frame profiles and the sash-frame profiles are connected temporarily to one another with the aid of at least one interposed spacer piece, which compensates for the difference in the frame outer dimensions in the direction of the frame plane, and, in this assembled arrangement, are jointly cut to size, welded and, if appropriate, finished. In this arrangement, the same (or another) spacer piece also gives an additional distance between the frame profiles in the direction perpendicular to the frame plane, which additional distance, depending on the thickness of the frame profiles, is set to a range of from 3–10 mm.

12 Claims, 1 Drawing Sheet

METHOD OF PRODUCING ENTIRE FRAMES MADE UP OF PLASTIC PROFILES

This Application is a continuation of application Ser. No. 08/543,903 filed Oct. 17, 1995, now abandoned entitled "Method of Producing Entire Frame Made up of Plastic Profiles".

BACKGROUND OF THE INVENTION

1. Field of the Invention

In the production of plastic window frames or door frames, separate cutting-to-size and welding operations are conventional nowadays for the profiles for the outer frames and the sash frames. In this arrangement, account has to be taken of the difference in the outer dimensions of the two frames in the direction of the frame plane, and this difference has to be precisely maintained during cutting-to-size and also during welding.

Modern frame systems provide a number of different outer-frame profiles and sash-frame profiles, which can be combined with one another corresponding to the respective requirement. This produces various dimensional differentials, which are established for all the possible pairings of outer-frame and sash-frame profiles. The respectively correct dimensional differentials, then, have to be taken, for example, from tables and set anew for each frame pairing during cutting-to-size and during welding. This involves a high degree of outlay and results in the risk of deviations in dimensions. Added to this is the fact that, in any case, double the number of operations arise due to the separate machining of the frames. This applies for the cutting-to-size and the welding as well as to the finishing, i.e. smoothing of the welded seam, which is usually still necessary after welding.

2. Description of the Related Art

Our own DE-A 26 23 750, then, has already proposed a method of producing entire frames made up of plastic profiles for outer frames and sash frames, in the case of which method the outer-frame profiles and the sash-frame profiles are connected temporarily to one another with the aid of at least one interposed spacer piece, which compensates for the difference in the frame outer dimensions in the direction of the frame plane, and, in this assembled arrangement, are jointly cut to size, welded and, if appropriate, finished. However, the proposed method falls down precisely in the production of the conventional entire frames for windows or doors. This is because conventional windows or doors are constructed such that the sash frame makes contact with, or at least comes near to, the outer frame in the operating position which is necessary for the proposed method. Consequently, the outer frame and the sash frame are welded to one another in the corner region when carrying out the method described in DE-A-26 23 750.

This is where the invention comes in. The invention is intended to provide a method of producing entire frames made of plastic profiles for outer frames and sash frames, which method does not have the disadvantages of the method described in DE-A 26 23 750 and thus makes it possible for the outer-frame and sash frame profiles of an entire frame to be cut to size and welded in one operation, taking account of the given difference dimensions, with a high degree of fitting accuracy.

SUMMARY OF THE INVENTION

Based on a method of the type described in DE-A 26 23 750, this is achieved according to the invention in that a spacer piece gives an additional distance between the frame profiles in the direction perpendicular to the frame plane. This prevents the situation where the sash frame and the outer frame are welded to one another in their corner regions, and this to be precise irrespective of whether the sash frame makes contact or not with the outer frame when the window or door is in the closed state.

The additional distance between the frame profiles in the direction perpendicular to the frame plane depends on the overall functioning of the profiles and is expediently set to a range of from 3–10 mm.

The spacer piece for compensating for the different dimensions in the direction of the frame plane and the spacer piece for giving an additional distance in the direction perpendicular to the frame plane may be constituted by a single part which takes account of both dimensions; they may also, however, be constituted by two separate parts for in each case one of the two dimensions. The conditions of the individual case determine which design of the spacer piece is expedient. Single-part spacer pieces have the advantage of a simpler and more clearly arranged storage, but may, if they are positioned in an unfavourable manner, under some circumstances impair the secure fixing of the profiles relative to one another and result, for example, in tilting movements of the outer frame.

The spacer pieces may be in the form of small individual blocks which are placed at a distance from one another between the profiles; however, they may also be designed as continuous spacer profiles. In the latter case, they expediently consist of a thermoplastic material which does not undergo welding with the frame material and can also be easily separated from the frames in the corners after the frames have been welded.

The advantages of the invention come to fruition particularly well if the sash-frame profile is one with an integrated glazing bar according to our German Patent Application P 44 01 969.6. Therein, description is given of a sash-frame profile which is latched with the glazing bar, whereupon the latched parts are then jointly cut to size, welded and, if appropriate, finished. This produces, in one operation with the sash production, a corner-welded "glazing-bar frame" with a very high degree of fitting accuracy. If such a sash-frame profile is used in the method according to the invention, the glazing-bar frame may also be produced simultaneously in one operation with the production of the entire frame. The necessary seals may be drawn into the profiles or preferably co-extruded.

All the components necessary for the production of a finished frame, that is to say the outer-frame profile, the sash-frame profile and the spacer piece, and preferably also the glazing bar and seals, can be packed to give a set of structural elements according to the invention, in which they are fixed, by an auxiliary means for producing a temporary assembled arrangement, in an arrangement in which there is compensation for the difference in the frame-profile outer dimensions in the direction of the frame plane and an additional distance is given between the frame profiles in the direction perpendicular to the frame plane. The step of packing to give the set of structural elements can be carried out, for example, by the profile manufacturer, so that the installer no longer has to carry out the fixing of the profiles themselves, but need only cut-to-size and weld said set of structural elements as such. This brings about a reduction in storage and additional cuts in the amount of work required, along with an extremely high degree of fitting accuracy of all the frame parts.

BRIEF DESCRIPTION OF THE DRAWINGS

The invention is explained in more detail hereinbelow in an exemplary embodiment with reference to the drawings, in which.

DETAILED DESCRIPTION OF THE INVENTION

The invention will now be described with reference to the accompanying drawings which show an embodiment of the invention.

Figure 2:
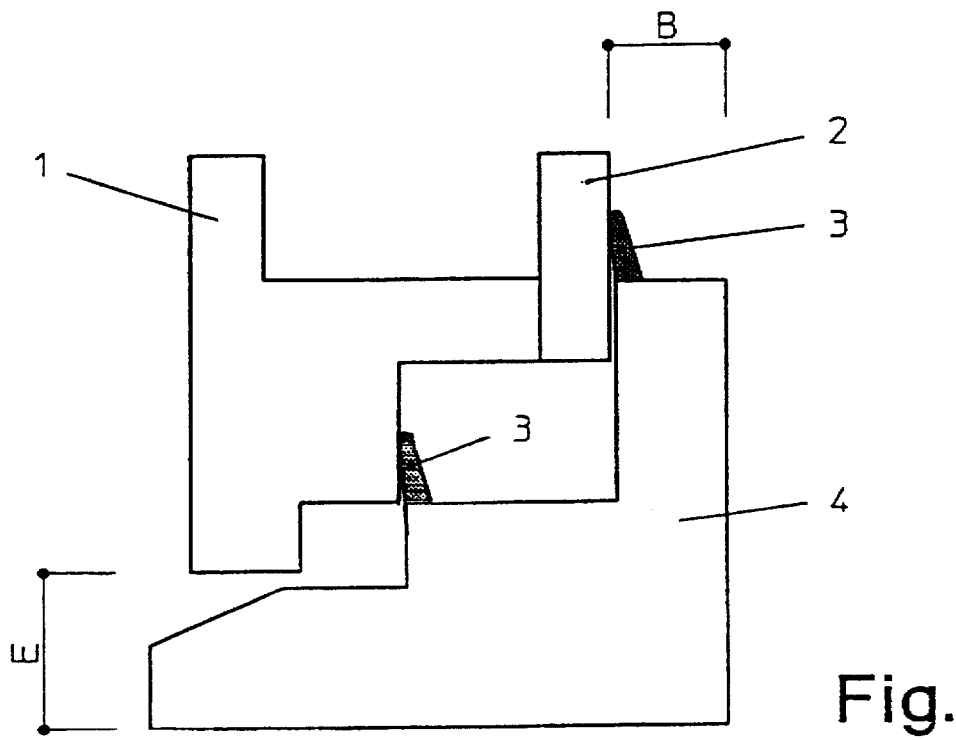
FIG. 2 shows the cross-sectional view of the same frame in the ready-to-use state.

The frame represented in FIG. 2 comprises a sash-frame profile 1 with glazing bar 2, an outer frame 4 and sealing profiles 3 between the outer frame and sash frame. In the direction of the frame plane, the outer dimension of the sash frame is smaller, by the amount E, than the outer dimension of the outer frame and, in the direction perpendicular to the frame plane, there is a dimensional difference B between the inner side of the outer frame and of the sash frame (and, in the depicted example, of the glazing bar).

Figure 1:
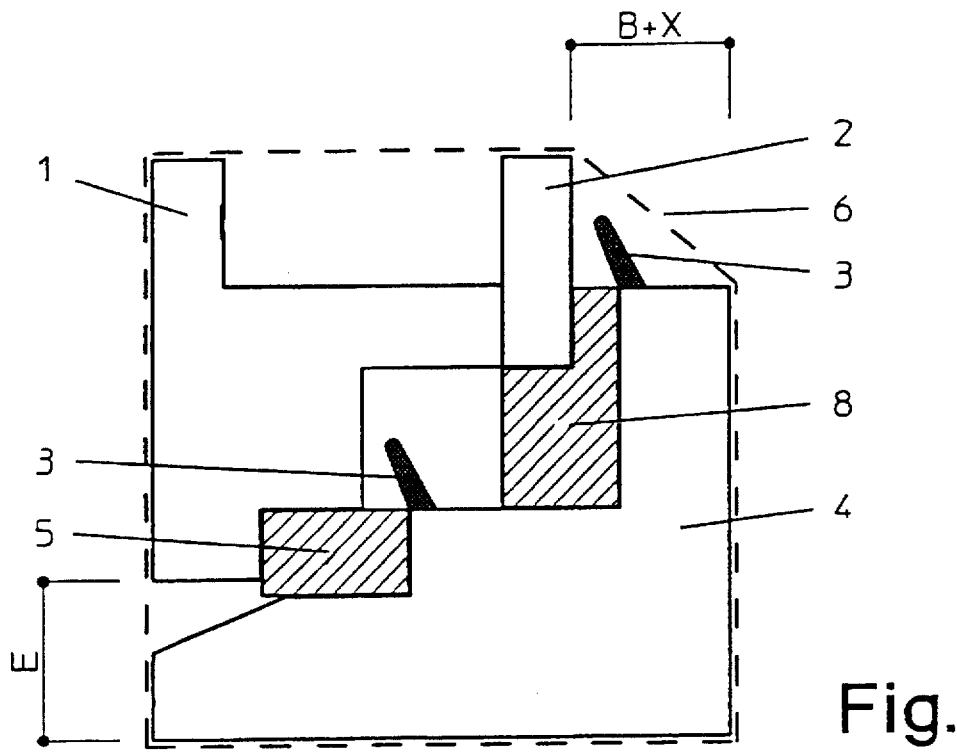
FIG. 1 shows the cross-sectional view of an entire frame before cutting-to-size and welding of the frame profiles.

In order to produce the frame according to FIG. 2, then, as is shown in FIG. 1, the profiles of the outer frame and of the sash frame 1 (in the depicted example together with the glazing bar 2 and the seals 3) are fixed with respect to one another, with the aid of interposed spacer pieces 5 and 8, at a distance which is necessary for the joint cutting-to-size and welding, and are connected temporarily to one another in this position. The temporary assembled arrangement, which is expediently produced by means of a shrink film 6 or by corresponding auxiliary means such as adhesive tape or tightening straps or by wrapping or the like, ensures that all the parts can no longer change their position relative to one another, with the result that the parts can then be jointly cut to size, welded and, if appropriate, finished in one operation in each case. Thereafter, the assembled arrangement is no longer necessary and can be released again.

The two spacer pieces 5 and 8 are dimensioned such that, in the direction of the frame plane, they produce the difference dimension E between outer frame 4 and sash frame 1 and, in the direction perpendicular to the frame plane, on the frame inner side, they produce an additional distance X between outer frame and sash frame. The difference dimension E is necessary for the sash frame to fit in the outer frame in an accurately fitting manner, and the additional distance X, which is in the order of magnitude of from 3–10 mm, prevents welding of the profiles in the corner region.

In principle, one of the spacer pieces 5 and 8 would suffice, but then there is the risk, in the depicted example, that, upon connection of the profiles by means of the shrink film 6, the sash-frame profile would tilt towards the outer-frame profile and no longer be correctly positioned. If, for example, the middle seal of the seals 3 were missing, the spacer pieces 5 and 8 could, in contrast, be readily designed as a single-part spacer piece.

Since the spacer pieces 5 and 8 rest firmly against the two frame profiles both in the direction of the frame plane and also in the direction perpendicular thereto, their correct fit is inevitably ensured. It is, however, also possible to dimension one of the spacer pieces only in order to produce the additional distance X, as long as care is taken that the correct fit of the spacer pieces between the profiles remains ensured.

The invention is not restricted to the application in the case of the basic example depicted, but can be used universally in the case of all frame profiles, because each frame profile has surfaces on which spacer pieces analogous to the spacer pieces 5 and 8, as well as single-part spacer pieces, can come to bear. It is also not necessary for the glazing bar and the seals to be processed jointly with the frame profiles. Although this is expedient in many cases, there are also cases in which it is more expedient for the glazing bar and the seals to be cut to size separately in the conventional manner and not welded. Moreover, producing an additional distance X is also not absolutely necessary if the frame profiles are already themselves spaced apart by a sufficient distance in the direction perpendicular to the frame plane.

What is claimed is:

1. A method of producing a plastic outer frame profile and a plastic sash frame profile assembly that can be connected to make a frame for windows or doors wherein the profiles are adapted to be provided in an operative position when finally assembled comprising:

temporarily connecting the outer frame profile and the sash frame profile to one another with the aid of at least one interposed spacer piece, wherein said spacer piece compensates for the difference between the outer dimensions of the outer frame profile and the sash frame profile in the direction of the frame plane during said temporary connection, and provides an additional spacing between said outer frame and sash frame profiles in the direction perpendicular to the direction of the frame plane relative to the operative position to thereby prevent said outer frame profile and sash frame profile from being welded to each other during welding.

2. Method according to claim 1, characterized in that the additional distance is set to a range of from 3–10 mm.

3. Method according to claim 1, wherein a single spacer piece is used to provide spacing between the outer frame profile and the sash frame profile.

4. Method according to claim 1, characterized in that the sash-frame profiles (1) are brought into the assembled arrangement with the outer-frame profiles together with their assigned glazing bar (2).

5. Method according to claim 1, characterized in that the temporary assembled arrangement of the profiles is produced by means of a shrink film (6).

6. A method according to claim 1 wherein the spacer piece is a thermoplastic material which does not undergo welding with the material of the frame profiles.

7. A method of producing a frame for windows or doors comprising a planar plastic outer frame and a planar plastic sash frame, wherein said planar plastic sash frame and planar plastic outer frame is adapted to be provided in an operative position when finally assembled, said method comprising:

temporarily connecting an outer frame profile and a sash frame profile to one another with the aid of at least one interposed spacer piece, wherein said spacer piece compensates for the difference between the outer dimensions of the outer frame profile and the sash frame profile in the direction of the frame plane during said temporary connection, and provides an additional spacing between said outer frame profile and sash frame profile in the direction perpendicular to the direction of the frame plane relative to the operative position to thereby prevent said outer frame profile and sash frame profile from being welded to each other, cutting the temporarily connected assembly to size, welding and, optionally, finishing the product of step (c).

8. A method according to claim 7, characterized in that the additional distance is set to a range of from 3–10 mm.

9. A method according to claim 7, wherein a single spacer piece is used to provide spacing between the outer frame profile and the sash frame profile.

10. A method according to claim 7, characterized in that the sash-frame profiles are brought into the assembled arrangement with the outer-frame profiles together with their assigned glazing bar.

11. A method according to claim 7, characterized in that the temporary assembled arrangement of the profiles is produced by means of a shrink film.

12. A method according to claim 7 wherein the spacer piece is a thermoplastic material which does not undergo welding with the material of the frame profiles.

* * * * *